United States Patent
Ohlswager

[15] 3,665,033
[45] May 23, 1972

[54] METHOD FOR COOLING THE REACTOR EFFLUENT FROM THE OXIDATION OF META-OR PARA-XYLENE

[72] Inventor: Stanley Ohlswager, Olympia Fields, Ill.
[73] Assignee: Atlantic Richfield Company, New York, N.Y.
[22] Filed: July 1, 1970
[21] Appl. No.: 51,516

Related U.S. Application Data

[63] Continuation-in-part of Ser. No. 727,977, May 9, 1968, abandoned.

[52] U.S. Cl. ..............................260/524 R, 62/58, 260/525
[51] Int. Cl. ........................................................C07c 63/02
[58] Field of Search.....................................260/524 R, 525

[56] References Cited

UNITED STATES PATENTS 3,364,256  1/1968  Ichikawa et al..........................260/525
3,402,047  9/1968  Shaul..........................................62/58

OTHER PUBLICATIONS

Weissberger; Laboratory Engineering, 1957, p. 157.

Primary Examiner—Lorraine A. Weinberger
Assistant Examiner—R. S. Weissberg
Attorney—McLean, Morton & Boustead

[57] ABSTRACT

A high temperature liquid stream containing dissolved solids which tend to deposit on heat exchange surfaces is combined and quenched with a low temperature recycle stream which is a portion of the feed stream to provide a mixture of intermediate temperature. Low temperature in the quench stream and removal of heat from the system are achieved by cooling the mixture of intermediate temperature at a relatively low temperature level and high mass velocity in a heat exchanger without substantial deposition of solids on exchange surfaces. The process is particularly effective in cooling the reactor effluent from the oxidation of meta- or para-xylene to isophthalic or terephthalic acid wherein the reactor effluent, comprising a saturated slurry of the acid product in an acetic acid medium, is at a temperature of at least about 200° F., and is combined with a quench stream of cooled product slurry. The amount and temperature of the quench stream are proportioned to give a composite stream of an intermediate temperature suitable for recycle to the oxidation reactor for temperature control and for product recovery by filtration. The quench stream is provided by diverting a non-supersaturated portion of the composite stream, in appropriate amount, through a heat exchanger operated at a relatively low temperature level and a linear velocity of about 5 to 15, and preferably 10 to 12, feet per second, to attain the appropriate temperature, of up to about 120° F., for quenching the feed stream.

8 Claims, 1 Drawing Figure

Patented May 23, 1972
3,665,033
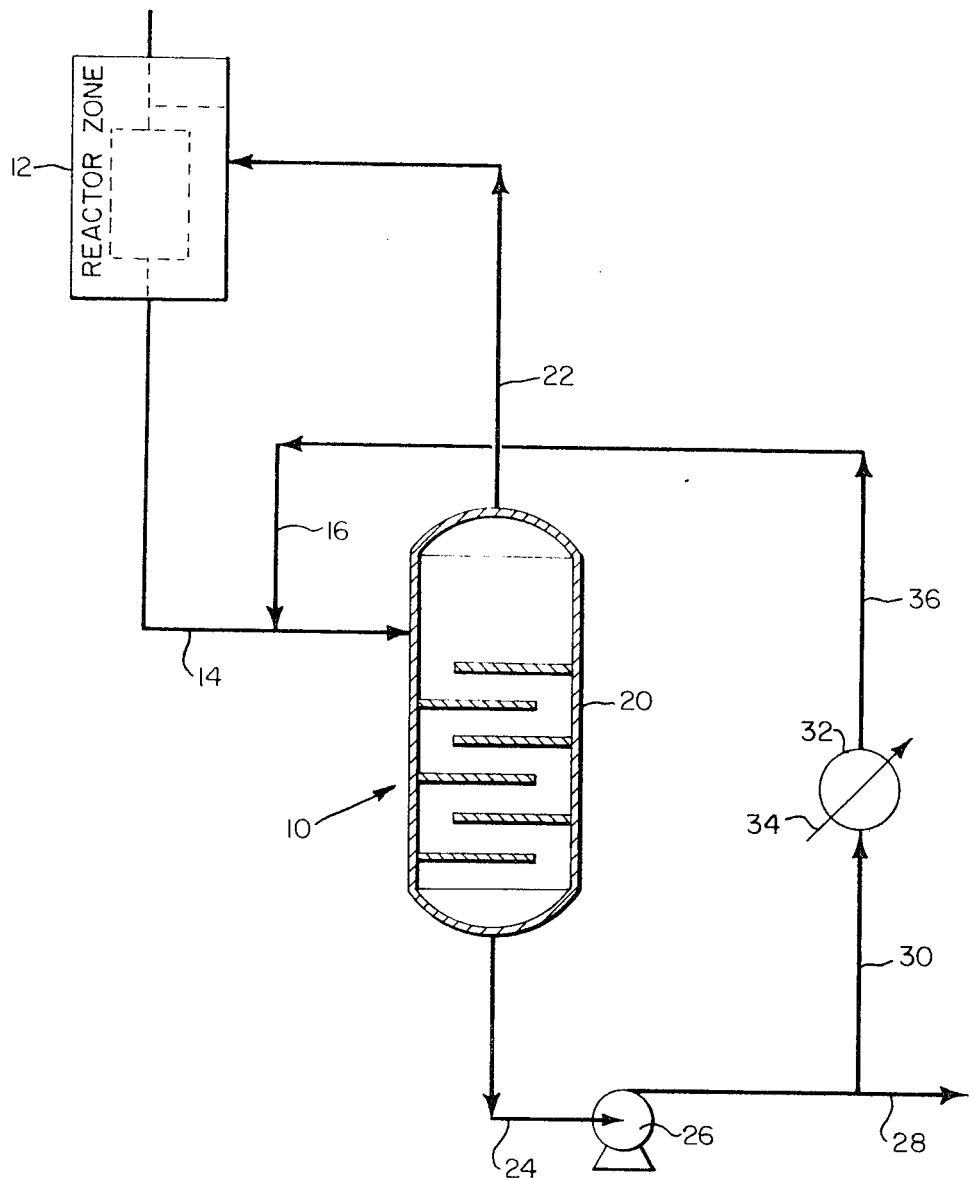
INVENTOR
STANLEY OHLSWAGER
BY McLean, Morton & Boustead
ATTORNEYS

METHOD FOR COOLING THE REACTOR EFFLUENT FROM THE OXIDATION OF META- OR PARA-XYLENE

This application is a continuation-in-part of my application, Ser. No. 727,977, filed May 9, 1968 and now abandoned.

This invention relates to a process for cooling liquid streams containing dissolved solids. More particularly, the invention relates to a heat exchange system for cooling liquid streams containing dissolved solids whereby adherence of crystallized materials to heat exchange surfaces is essentially prevented. Still more particularly, the invention relates to a heat exchange system whereby a liquid reaction medium containing dissolved solid reaction product may be cooled for product recovery, for recycle to the reaction zone, or for some other purpose, or combination of purposes, whereby deposition of crystallized reaction product on heat exchange surfaces is alleviated.

Upon cooling of reactor effluent streams, such as solutions or slurries, containing dissolved solids, there can be a tendency for the dissolved material to crystallize at the cold surfaces of a heat exchanger if the wall temperature is below the temperature of total solubility at the concentration of the stream. Frequently, the crystallized solids will adhere to the heat exchange surfaces and form a layer resistant to heat transfer, resulting in a deterioration of heat exchanger performance.

A particular example of the deposition of solids on heat exchanger surfaces arises in the operation of an isophthalic acid production unit. Exothermal oxidation of xylenes to phthalic acids is well known, and is ordinarily conducted by passing a stream comprising a lower alkanoic acid solvent, such as acetic acid, containing an oxidation catalyst and about 5 to 15 weight percent xylene, into a reactor where the stream is contacted at elevated temperatures on the order of about 250° F., e.g. about 230° to 275° F., with an air or other gaseous source of oxygen to accomplish a liquid phase oxidation. In an exemplary operation, meta-xylene and a cobalt acetate oxidation catalyst are dissolved in acetic acid, contacted with air, and isophthalic acid is produced in the form of a slurry of solid product, part of which is dissolved at operating temperatures. The reaction is strongly exothermic and it is necessary to provide for the removal of excess heat from the reactor in order to maintain the desired operating temperature of about 250° F. Also, at the reaction temperature, the isophthalic acid product is fairly soluble in the acetic acid and the reactor effluent must be cooled to insure adequate recovery of the product in crystalline form. To provide the needed cooling, the reactor effluent is passed through a heat exchange system and the cooled stream divided into a first stream for recycle to the reactor for temperature control and a second stream for passage to a succeeding reactor or to the product recovery zone or to any other desired point in the system.

In this process, operations utilizing conventional heat exchange techniques result in a number of problems. Under ordinary conditions, severe plating of isophthalic acid occurs on heat exchange surfaces, severely impairing effectiveness. Utilization of special materials, such as titanium, increases expense tremendously, while operation at extremely high linear velocities results in prohibitive power requirement for pumping and severely shortened life of equipment when handling slurry materials. It is therefore an object of this invention to provide a process for cooling liquid streams containing dissolved solids, especially a stream in an isophthalic acid production system. It is another object to provide a system for cooling liquid steams containing dissolved solids whereby deposition of the solids on the heat exchange surfaces is essentially prevented. These and other objects are realized by the process of this invention.

In general, the process of the present invention comprises combining a liquid stream containing dissolved, normally solid materials, with a lower temperature recycle quench stream to provide a mixed stream having an intermediate bulk temperature. Heat is removed from the system by cooling to the appropriate quench stream temperature in an indirect heat exchanger all or, preferably, only a portion of the intermediate temperature stream which enters the heat exchange zone and contains said dissolved solids in an amount below that which would supersaturate the liquid phase of the stream to a significant extent. Preferably, the stream leaving the heat exchange zone also contains the dissolved solids in an amount below that which would supersaturate the liquid phase of the stream to a significant extent. The net effluent from the system can be withdrawn either at the intermediate temperature or at the recycle quench stream temperature. The temperature and amount of the low temperature recycle quench stream are appropriate to provide an intermediate bulk temperature stream which can be cooled at low concentration gradient and temperature levels to provide a heat exchanger effluent of appropriate temperature without undue deposition of the solute on the heat exchange surfaces.

The rate of crystallization of solids from a saturated solution or rate of fouling of heat exchanger surfaces is a function of the concentration gradient resulting from the temperature difference across the solution or slurry film and the concentration gradient resulting from the supersaturation of the solution. As the heat flux is increased, or as stream velocity is decreased, the temperature gradient between the solution bulk and the heat exchanger wall increases and, hence, the concentration gradient increases. A plot of experimental data on the deposition rate against the concentration gradient for the isophthalic acid system gives a single, essentially straight line which is independent of the operating variables of heat flux, velocity, and log mean temperature difference. The line may be represented as $dR/d\theta = k_1 (\Delta C_f + \Delta C_s) - k_2$ where: $dR/d\theta$ is the rate of increase in resistance to heat transfer as a result of deposition of solids on the cold wall; $\Delta C_f$ is the concentration gradient resulting from the temperature difference across the solution of slurry film; $\Delta C_s$ is the concentration gradient resulting from the supersaturation of the solution; $k_1$ is the deposition rate constant; and $k_2$ is the removal rate constant.

While the concentration gradient is a function of the temperature gradient, it is also a function of the temperature level of the system. The relationship of the concentration gradient and the temperature level for a saturated isophthalic acid-acetic acid solution is shown in Table I:

TABLE I

| T, °F. | ΔC/ΔT |
|---|---|
| 150 | 0.000084 |
| 200 | 0.000160 |
| 250 | 0.000290 |

It follows from the relationship that the rate of deposition decreases as the bulk temperature is decreased. The conclusion was verified by additional experimental data for similar saturated isophthalic acid-acetic acid solutions illustrated at two temperature levels in Table II.

TABLE II

| Bulk temp., °F. | Heat flux Q/A BTU/Hr.—Ft² | Linear velocity Ft./Sec. | dR/dθ |
|---|---|---|---|
| 150 | 6,000 | 10 | 0.0006 |
| 200 | 6,000 | 10 | 0.0016 |

Additional experimental data were obtained to establish the conditions at which no deposition at all would occur in the isophthalic acid system. Again the concentration gradient and temperature appeared as correlative variables as indicated by the following examples in Table III, where no deposition occurred:

TABLE III

| Run | Surface | T, °F. | Q/A | Linear Velocity Ft./Sec. | ΔC |
| --- | --- | --- | --- | --- | --- |
| 1 | 316 stainless steel | 200 | 2600 | 21.9 | 0.00050 |
| 2 | " | 150 | 5800 | 21.1 | 0.00065 |
| 3 | " | 150 | 4000 | 11.0 | 0.00074 |
| 4 | " | 150 | 2200 | 6.2 | 0.00065 |
| 5 | deposit coated surface | 150 | 3850 | 10.0 | 0.00077 |

The data in Table III show that low operating temperature and high velocity are greatly to be desired in order to avoid deposition.

The concentration gradient $\Delta C_f$ is inversely proportional to mass velocity. In particular, it is inversely proportional to the 0.8 power of mass velocity. Thus, it is apparent that at a given mass velocity the concentration gradient resulting from supersaturation of the slurry, $\Delta C_s$, can have an effect upon the cooling permissible in the process without obtaining solids deposition. The amount of supersaturation of the solids in the liquid stream also affects the rate of surface fouling to the extent that the surface area of the solids in a particular slurry is decreased by the fact that some of the solids are dissolved in solution rather than present as a slurry. The effect of the amount of supersaturation of solids in the liquid slurry can be seen in the following table which shows the values $dR/d\theta$ observed at a heat flux of from 2,000 to 2,200 BTU/hr.-ft.$^2$ and a slurry velocity from 8.5 to 11.0 feet per second.

TABLE IV

| % Solids at Mixer Temperature | dR/dθ Solution Tank Temp. °F. | | |
| --- | --- | --- | --- |
| | 160 | 200 | 250 |
| 1 | 0.000190 | 0.000280 | |
| 5 | 0 | 0.000016 | 0.000100 |
| 9 | | | 0.000045 |
| 20 | | | 0.000012 |

The affect of surface area on the rate of fouling at a constant temperature of 250°F., a heat flux of 2,000 to 220 BTU/hr.-ft.$^2$ and velocity from 8.5 to 11.7 feet per second is shown in Table V.

TABLE V

| Solids Surface in²/in³ of Slurry | dR/dθ % Solids | |
| --- | --- | --- |
| | 5 | 9 |
| 103 | 0.000120 | |
| 200 | 0.000040 | |
| 255 | | 0.000050 |
| 397 | | 0.000033 |
| 726 | | 0 |

The degree of supersaturation in the mixing device is a function of the potential amount of crystallizable solids which is determined by the feed rate to the mixer times the difference in solubilities at feed temperature and mixer temperature. The following two runs during which other variable were nearly constant, appear to show this effect:

| % solids | solids surface area in²/in³ | mixer temp. °F. | Q/A | velocity ft./sec. | cooler circul. gpm | potential IPA cryst. in mixer lb./hr. | dR/dθ |
| --- | --- | --- | --- | --- | --- | --- | --- |
| 5 | 424 | 108 | 2000 | 8.5 | 740 | 262 | 0 |
| 9 | 397 | 108 | 2200 | 10.1 | 780 | 505 | 0.000033 |

The solids surface area is apparently affecting the system in two ways. In the quenching of the hot slurry in the mixer, rate of crystallization is a function of the surface area of existing crystals on which growth can occur. The higher this rate is, the lower will be the supersaturation. The second effect is one of competition with the exchanger surface for crystal growth. It is thus apparent that the amount of superstaturation of solids in the liquid streams has an effect on the rate of fouling in the heat exchanger.

Thus, the process of this invention, in its broadest terms, comprises removing heat at relatively low bulk temperatures from a stream containing dissolved, normally solid material, whereby plating out of the solids on heat exchange surfaces is essentially prevented. When the stream containing dissolved, and often suspended solids, the amount of dissolved solids being below that which gives significant supersaturation of the liquid phase, enters the heat exchange area at a temperature of at least about 200° F., e.g. about 225° to 275° F., heat can be removed from the system by an indirect heat exchanger without deposition on its surfaces, or at least without forming deposits at a significant rate, by first reducing the temperature of the feed stream to a lower or intermediate level at which the indirect heat exchange can take place without encountering deposition difficulties. Thus, the high temperature feed stream is quenched or cooled to the intermediate temperature level by combination with the lower temperature indirect heat exchanger effluent. In this manner, the indirect heat exchanger can be operated at linear velocities of about 5 to 15, and preferably about 10 to 12, feet per second, to produce effluents having bulk temperatures of about 120° F. or less. Preferably, the liquid phase entering the heat exchanger is essentially saturated with the desired product and still more advantageously, the effluent from the heat exchange zone has a liquid phase which is similarly saturated.

As previously stated, in order to achieve the intermediate bulk temperatures of about 150° F., or less, e.g. about 100° F., in the present invention, there is combined with the higher feed temperature stream to be cooled a relatively low temperature quench stream of essentially the same composition as the stream to be cooled and in an amount sufficient to provide an intermediate temperature for the combined streams of about 150° F. or less, which generally is the bulk temperature desired. The quench stream is provided by cooling all or a portion of the non-supersaturated combined stream at the intermediate temperature to the appropriate quench temperature, e.g. below about 120° F., particularly about 90° to 115° F., and can be provided in a recycle quench to higher temperature stream volume ratio of about 4:1 to 20:1, preferably about 6:1 to 12:1. The temperature and quantity of the quench stream are correlative variables; e.g., the lower the temperature of the quench stream, the greater the cooling effect, and consequently the lower the quantity required to produce a given bulk temperature level. Of course, the net effluent of the cooling system may be withdrawn either at the intermediate bulk temperature or at the recycle quench stream temperature, or, in the event more than one effluent stream is desired, a stream can be removed at each temperature or two or more streams can be withdrawn at either temperature. Any means for carrying out the process is within the scope of the present invention, although particular operations have been devised to operate with high efficiency and which constitute the preferred embodiment of this invention.

The present invention will be more fully understood from the following description with reference to the drawing in which the sole FIGURE is a flow chart of a preferred embodiment of the present invention.

In the FIGURE, a reactor effluent stream containing dissolved solids enters the cooling zone generally designated as 10, from reactor zone 12 through line 14 and is combined with a cooled recycle stream in line 16. The combined stream is then passed into mixing tank 20 where it reaches an intermediate temperature, that is, between the temperature of the streams in lines 14 and 16, respectively. Since the reactor effluent stream in line 14 is cooled without contacting a heat exchanger surface, no deposition or plating of solids occurs, although considerable solids crystallize. A portion of the combined stream in tank 20, which is at the intermediate temperature is returned to the reactor zone 12 through line 22 for reaction temperature control, while the balance of the combined stream is removed from tank 20 through line 24 by pump 26. The liquid phase of the stream in line 24 is essentially saturated with the desired product. A portion of the stream in line 24 is removed through line 28 to provide net recovery from the operation while another portion of the stream in line 24 is diverted through line 30 and cooler or heat exchanger 32 to provide the recycle cooling stream. The stream in line 30 which passes into a tube-type heat exchanger 32 is cooled from the intermediate temperature of mixing tank 20 to the desired low temperature for quenching the feed stream by flow of coolant through the heat exchanger via line 34. The cooled recycle stream then passes from the heat exchanger into line 36 from which it passes into line 16, as described above, to cool fresh reactor effluent. Of course, if desired, a product stream could be obtained from line 36. In the foregoing manner, heat exchanger 32 is operated at a lower bulk temperature than would be possible in a straight-through cooling operation. Thus, it is possible to cool a dissolved solids-containing stream without deposition of solids on heat exchange surfaces. While the dissolved solids in the stream will crystallize out, conditions are readily maintained so that little, if any, solids deposit on equipment surfaces and the resultant slurry is readily handled in known fashions.

The present invention is particularly concerned with cooling of a saturated slurry of isoptalic or terephthalic acid, in a phthalic acid production process wherein it is desirable to provide a recycle stream to an oxidation reactor for temperature control, and to provide a product slurry at low enough temperature that the major part of the acid product may be recovered by filtration. From the characteristic behavior of the system, it is found that the reactor recycle and the product effluent streams may be provided by the operation of the process of the present invention. The feed to the cooling system from the oxidation reactor is a slurry of the phthalic acid generally at a temperature of at least about 200° F., typically about 225° to 275° F. and often about 240° to 250° F. For effective temperature control of the reactor and efficient product recovery, it is necessary to reduce the temperature stream to at least about 150° F., and preferably lower, for instance to about 125° F., or 120° F., or even lower. By the present process, the reactor product slurry can be cooled from about 250° F. to about 120° F. by providing a quench stream at a temperature of about 105° F. in a recycle quench-to-feed volume ratio of about 9:1. The composite stream, i.e. the mixed feed and recycle quench streams, equilibrates at an intermediate temperature of about 120° F. and is essentially saturated with respect to the phthalic acid product. The quench stream is, as discussed above, provided by cooling the composite to the requisite temperature by indirect heat exchange. At the required temperature levels of the composite stream and the recycle quench stream, it is possible to utilize readily available cooling media, such as, water at ambient conditions. For instance, cooling water at about 75° F. to about 100° F. can serve to reduce the temperature of the stream from about 120° F. to about 105° F. at a linear velocity of about 5 to 15 feet per second, particularly about 10 feet per second, without deposition of isophthalic or terephthalic acid in the heat exchanger.

Control of the cooling process can be readily provided by varying the temperature of the cooling medium in the exchanger and the linear velocity of the stream through the exchanger, e.g. as mentioned above, to between about 75° and 100° F. and about 5 to 15 feet per second. In this manner the temperature and the amount of the quench stream recycled to be combined with the cooling process feed may be controlled to provide for variations in the temperature of the feed.

In order to avoid supersaturation of the liquid phase entering, and preferably also leaving, the indirect heat exchanger, the product slurry, when cooled by direct exchange with the recycle stream, should contain adequate solids. Such solids may already be present in adequate amounts in the product slurry but they can be added to the system, e.g. to the slurry, the mixing tank or the recycle stream, in the appropriate amount if desired or needed. Thus, the amount of undissolved product solids added to the system as noted above, can often be about 5 or 10 to 20 weight percent based on the product slurry, i.e. on a non-recycle stream basis.

The amount of solids needed can be affected by the extent of supersaturation of the liquid, temperatures of the streams, etc., but will be an amount sufficient to essentially prevent significant supersaturation of the dissolved solids in the liquid phase of the stream. The added solids are preferably at the temperature of the recycle quench stream and further are often of a size range sufficient to have a surface area, $in^2/in^3$, of at least about 200 up to about 5,000 or more, preferably about 200 to 1,200 $in^2/in^3$.

The following example serves to further illustrate the invention.

An oxidation reaction is conducted to produce isophthalic acid from meta-xylene. Effluent from the reactor is a saturated slurry of about 14 weight percent isophthalic acid in acetic acid, about 2 percent of which are solids. Also present in the slurry are various minor amounts of impurities such as ortho- and terephthalic acids and dissolved oxidation catalyst, i.e. cobalt acetate. In order to avoid supersaturation in the liquid phase entering or leaving the downstream indirect heat exchanger about 10 weight percent, based on the slurry, of finely divided isophthalic acid is added to the slurry. The reactor effluent stream, including the added solids, enters the cooling zone at about 250° F. and rate of about 88 gal. per minute. The effluent is combined with a cooled recycle quench stream at about 106° F. supplied at about 724 gal. per minute. The combined streams are mixed in a baffled mixing tank and the composite stream attains a temperature of about 121° F. Considerable isophthalic acid crystallizes out of solution in the mixing tank, but none of the material deposits on the surfaces of the equipment. The holding time in the mixing tank is sufficient to give a cooled stream whose liquid phase is essentially saturated but not supersaturated, e.g. a holding time of 1 to 2 minutes. About 39 gal. per minute of the cooled stream is withdrawn from the mixing tank for return to the oxidation reactor at about 121° F. for temperature control of the strongly exothermic reaction. About 49 gal. per minute is pumped to the product recovery zone or to a subsequent stage reactor as net product, and the balance of about 724 gal. per minute is passed to a water cooled heat exchanger at a linear velocity of about 10 ft. per second. The heat exchanger serves to cool the stream from about 121° F. to about 106° F. The stream passing from the heat exchanger then serves as recycle quench stream. The low mass temperature of the stream passing through the heat exchanger prevents deposition of isophthalic acid solids on the exchange surfaces in accordance with the present invention.

I claim:

1. A method for cooling a higher temperature stream of a liquid containing a dissolved solid which tends to deposit on cool surfaces upon crystallization, to a lower temperature at which said solid will crystallize without substantial deposit of the solid on the cool surfaces comprising contacting the higher temperature stream with a relatively lower temperature quench stream of essentially the same composition to provide a combined stream at an intermediate temperature, said higher temperature being at least about 200° F. and said relatively lower temperature being up to about 120° F., said intermediate temperature being up to about 150° F., cooling at least a portion of said intermediate temperature stream to the said relatively lower temperature to provide the lower temperature quench stream, said intermediate temperature stream being cooled to said relatively low temperature by indirect heat exchange at a linear velocity for said intermediate temperature stream of about 5 to 15 feet per second, and said intermediate temperature stream, upon entering the indirect heat exchange zone, having in solution dissolved solids in an amount below that which supersaturates the liquid phase of said stream.

2. The method of claim 1 wherein the higher temperature stream comprises acetic acid and a phthalic acid produced by the liquid phase air oxidation of an acetic acid stream containing about 5 to 15 wt. % of the corresponding xylene in the presence of a cobalt oxidation catalyst at a temperature of about 230° to 275° F.

3. The method of claim 1 in which the liquid phase of the stream entering and leaving the heat exchange zone is essentially saturated with dissolved solids.

4. The method of claim 1 wherein the lower temperature quench stream to higher temperature stream volume ratio is about 4:1 to 20:1.

5. A method for cooling an effluent stream comprising acetic acid and isophthalic acid, said stream being the effluent of a process for the liquid phase air oxidation of an acetic acid stream containing about 5 to 15 wt. % of meta-xylene in the presence of a cobalt acetate oxidation catalyst at about 230° to 275° F., said method comprising contacting said effluent stream with a recycle quench stream of essentially the same composition as the effluent stream and having a temperature up to about 120° F. in a recycle quench stream-to-effluent stream volume ratio of about 4:1 to 20:1 to provide a combined stream at an intermediate temperature of up to about 150° F., withdrawing a first portion of said combined stream for return to said oxidation process for temperature control and withdrawing a second portion of said combined stream, the remainder of said combined stream constituting the recycle quench stream, and passing the remainder of said combined stream through an indirect heat exchanger at a linear velocity for the stream of about 5 to 15 feet per second while cooling said remainder to a temperature of up to about 120° F. to provide said recycle quench stream, said combined stream when entering and leaving said heat exchanger having a liquid phase which is essentially saturated with isophthalic acid.

6. The method of claim 5 wherein said effluent stream temperature is about 250° F., said recycle quench stream temperature is about 105° F., said intermediate temperature is about 120° F., and said quench-to-feed ratio is about 9:1.

7. The method of claim 5 wherein said linear velocity is about 10 to 12 feet per second.

8. The method of claim 7 wherein the ratio is about 6:1 to 12:1.

* * * * *